(12) United States Patent
Atcitty et al.

(10) Patent No.: US 6,353,304 B1
(45) Date of Patent: Mar. 5, 2002

(54) OPTIMAL MANAGEMENT OF BATTERIES IN ELECTRIC SYSTEMS

(75) Inventors: Stanley Atcitty; Paul C. Butler; Garth P. Corey, all of Albuquerque, NM (US); Philip C. Symons, Morgan Hill, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/766,219

(22) Filed: Jan. 19, 2001

(51) Int. Cl.[7] .............................................. H01M 10/46

(52) U.S. Cl. ...................................................... 320/116

(58) Field of Search ................................. 320/103, 116, 320/117, 119, 120, 128

(56) References Cited

U.S. PATENT DOCUMENTS

| | | | |
|---|---|---|---|
| 4,797,566 A | 1/1989 | Nozaki et al. | 307/43 |
| 5,504,415 A | 4/1996 | Podrazhansky et al. | 320/18 |
| 5,905,360 A | 5/1999 | Kalsha | 320/118 |
| 6,150,795 A | 11/2000 | Kutkut et al. | 320/118 |
| 6,304,059 B1 * | 10/2001 | Chalasani et al. | 320/118 |

* cited by examiner

Primary Examiner—Edward H. Tso
(74) Attorney, Agent, or Firm—George H. Libman (57) ABSTRACT

An electric system including at least a pair of battery strings and an AC source minimizes the use and maximizes the efficiency of the AC source by using the AC source only to charge all battery strings at the same time. Then one or more battery strings is used to power the load while management, such as application of a finish charge, is provided to one battery string. After another charge cycle, the roles of the battery strings are reversed so that each battery string receives regular management.

15 Claims, 11 Drawing Sheets

OPTIMAL MANAGEMENT OF BATTERIES IN ELECTRIC SYSTEMS

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

When rechargeable storage batteries are used in electric systems, the requirements for power to be delivered to the connected loads in discharge and/or the availability of power for charging typically do not have values that allow maximization of life of the batteries and maximization of the performance of the systems of which the batteries are a part.

Figure 1:
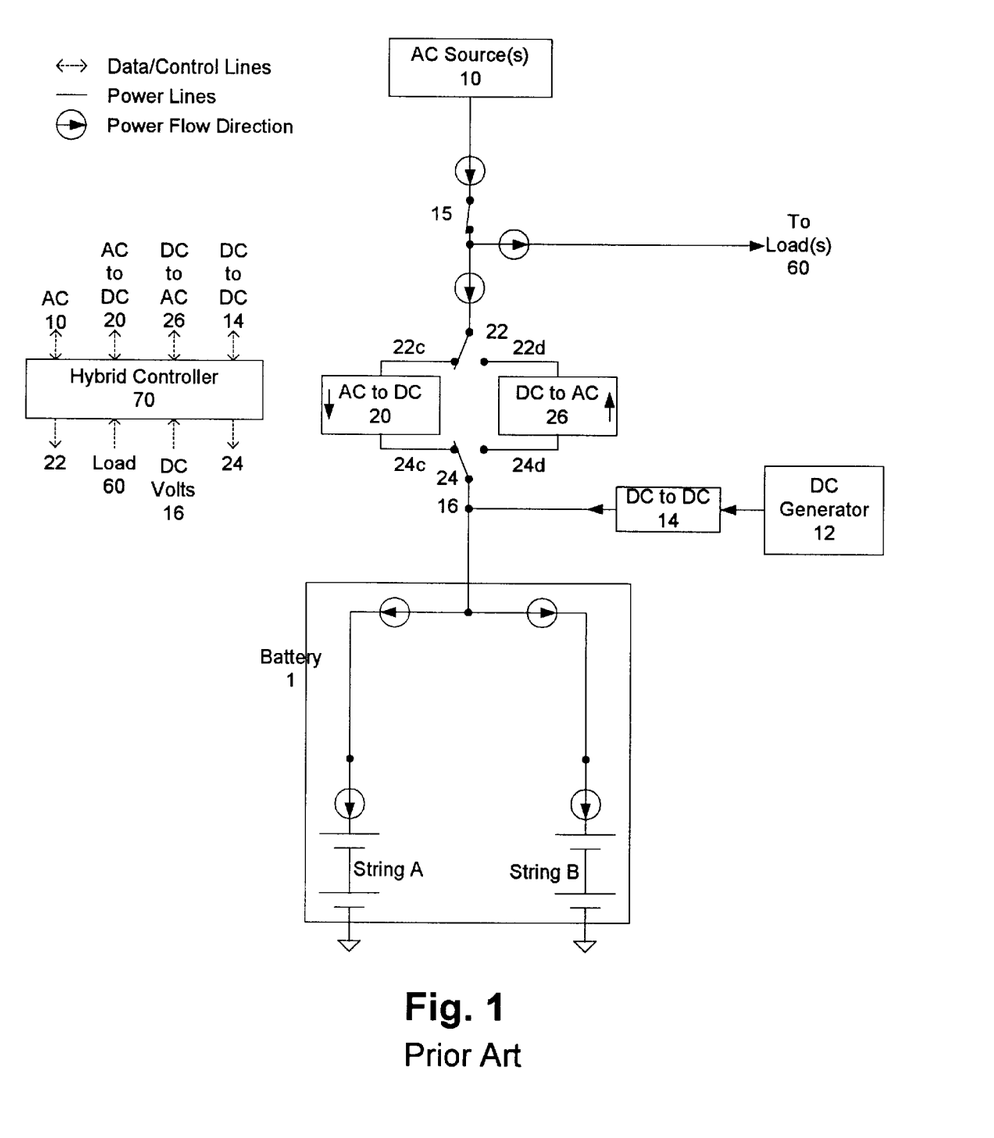
FIG. 1 shows a generic prior art electric system on which the invention can be used.

FIG. 1 shows a typical prior art electrical system which provides uninterrupted electrical power to a load or loads 60. The system includes a primary power source such as AC source 10 (for example, a stand-alone AC generator or generators, or other source of AC electricity such as an electric utility), a single-throw switch 15 which allows the AC source 10 to be disconnected from the system, double-throw switches 22 and 24 to alternately connect an AC to DC converter 20 or a DC to AC converter 26 between the AC source or load(s) and battery 1. The converters 20 and 26 with the switches 22 and 24 may optionally be a two-way converter which combines the function of 20 and 26 into a single unit. The battery 1 is shown as consisting of two strings, String A and String B, but may optionally consist of any number of strings equal or greater than 1.

The generic electric system shown in FIG. 1 may, but not necessarily, also include supplemental generators, such as that shown as DC generator 12, connected to the battery via power conversion equipment such as the DC to DC converter 14. In one typical application, DC generator 12 is a photovoltaic array for generating DC from solar power.

In FIG. 1, the electric system is shown with the switches 15, 22 and 24 in a position such that the battery 1 can be charged and the load(s) 60 can be supplied with electric power from the AC source 10. The direction of current flow in the various legs of the circuit is indicated with the symbol ⊖ in FIG. 1 and in subsequent figures. If electricity is not being supplied by the AC source 10 for any reason, switch 15 is opened, and switches 22 and 24 are put into their alternate position so that the load(s) 60 can be supplied with electricity from the battery 1 via the DC to AC converter 26. Alternatively, if the DC to AC converter 26 and the AC source 10 are synchronized in a manner conventional in the art, then switch 15 can remain closed. In this event, discharge of the battery can supplement the supply from the AC source so that the battery 1 and the AC source 10 jointly supply the load(s) 60.

The electrical power requirements of the load(s) and the capabilities of the AC source in electric systems are often such that the battery cannot be charged and/or discharged in the manner required to maximize both the life of the batteries and the performance of the electric system.

For example, batteries based on the zinc/bromine chemistry need to be completely discharged occasionally to maximize their utility. However, such batteries should never be completely discharged when they are used to provide back-up power for critical manufacturing processes, as they otherwise might not be available at critical times.

As another example, certain types of nickel/cadmium batteries exhibit a memory effect which results in an apparent loss of available capacity when repeatedly partially discharged and then recharged. This loss of capacity can be recovered by completely discharging and recharging the battery. These batteries are sometimes used in hybrid electric vehicles where power for recharge is only available during vehicle operation, so the frequent complete discharges these batteries require for optimal life and performance cannot be effected.

As a third example, the state of charge of lead-acid batteries used to help match supply from an electric generator (or electric generators if they are connected into an electricity supply network) and the demand (load requirements) from customers connected to that generator, cannot be optimally managed because the power available for recharge or that required in discharge are determined by the difference between the supply available from the generator(s) and the load demanded by customers. Lead-acid batteries perform best and live longest if each charge is completed (finished) properly and if they are not discharged too deeply. On the other hand, system performance will be maximized if the generator is used only when absolutely necessary. None of these optimization criteria can be strictly adhered to because of the highly variable power available or required in the supply-load matching process. Finishing charge and avoiding overdischarge of lead-acid batteries, and optimizing the performance of systems using lead-acid batteries to help generators match supply and demand, are one of the most important potential applications for the invention disclosed herein.

Most battery manufacturers offer guidelines for ways to optimally charge and discharge their products so as to maximize life and performance. Implementation of these guidelines is made complicated for users by virtue of the fact that most batteries are in fact a collection of individually manufactured units, each of which has slightly different performance characteristics.

The most fundamental unit of batteries is a cell, a unit of 1 to 4 volts depending on the chemistry on which the battery is based. A cell consists of a collection of positive electrodes in parallel and negative electrodes in parallel, juxtaposed so to provide the power and the ampere-hour capacity specified. Sometimes, a few cells (of the order of three to eight) are assembled into modules, with the series electrical connections between the cells being effected during manufacture. Cells or modules are then electrically connected in series at the point of use to form strings.

Other batteries are based on cell-stacks consisting of a number of cells electrically connected in series. In this case, modules are fabricated by connecting a number of cell-stacks in electric series and/or parallel. With some battery chemistries, battery auxiliaries, such as pumps for flow batteries or thermal management hardware for both conventional and advanced batteries, are incorporated with the cells or the cell-stacks into a module.

A storage battery (sometimes referred to as a battery system) consists of a number of cells or modules arranged in series and/or parallel arrays. Cells or modules connected in series are collectively referred to as a battery string. Battery strings may then be electrically paralleled. Occasionally, there is only one module in a string, and infrequently, cells are placed only in parallel in a battery. In these cases, there is no meaning to the term string, but if there were, a string would consist of one module or one cell. Alternatively, a battery consists at times of only one string of cells or modules. As discussed here and after, the current invention does not relate to such single string batteries; at least two strings in parallel are required for operation of this invention, although each of the strings may consist of one or more cells or modules in series.

The number of cells or modules in series in a string or battery is determined by the voltage desired for the battery system, which is in turn set by the requirements of the charging and discharging equipment to which the battery is connected. The charging and discharging equipment is generally referred to as power conversion equipment. The number of strings in parallel is determined by the capacity, i.e., the number of ampere-hours, or the energy rating, i.e., the number of watt-hours, that is desired by the user of the battery system.

Figure 2:
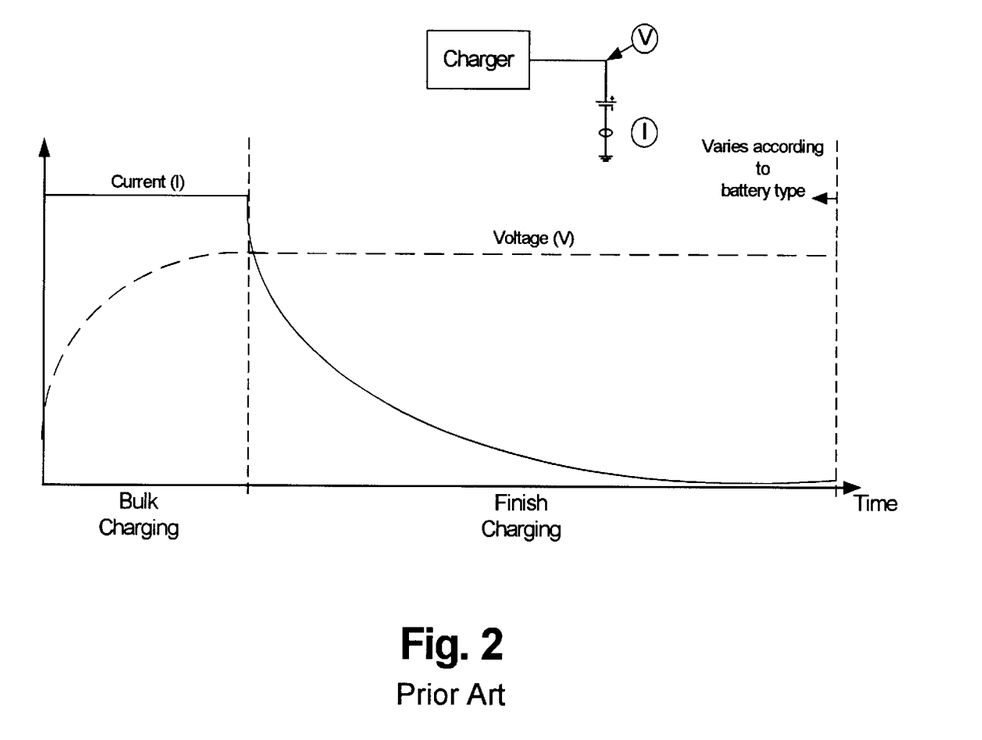
FIG. 2 shows a generalized charge profile for a lead-acid battery.

In order to standardize the terms used herein, FIG. 2 shows a charge profile for a lead-acid battery. When a constant current is initially applied to a discharged battery, bulk charging occurs and the voltage across the battery increases in a generally exponential manner to the voltage set-point level of the battery. At this point, the charging voltage is held constant and the current begins to fall off in a generally exponential manner. This finish charging period continues until the current reduces asymptotically to a relatively low value. Finish charging is ended by a time limit, low current threshold, or amp-hour overcharge level. A nickel/cadmium battery has a somewhat similar profile, but a zinc/bromine battery is normally charged with a fixed, constant power until charging is deemed complete.

While the term 'finish charging' is well-understood by both battery manufacturers and users, 'equalization' is not. In fact some authors incorrectly use the terms interchangeably, and in other writings there is some confusion over the terms. Here, finish charging is defined as a process at the end of nearly every bulk charge when the battery has reached regulation voltage and the charge current tapers (i.e., reduces in magnitude) because of an exponential increase in the effective resistance of the cells of the battery as further charge is applied. Finish charging a lead-acid battery typically takes on the order of one to four hours.

'Equalization' has two distinct definitions in the battery field. For one definition, which is not utilized in this invention, it means actively adjusting the charge of individual cells in a string in order to restore each cell to an equal state of charge. For the other definition, which is utilized herein, equalization in a lead-acid battery is accomplished by an extended-period, relatively low current, charge following a regular recharge. During equalization, the voltage is raised a little above the fully-charged open circuit voltage and current is limited for a period of on the order of twelve to twenty-four hours. The current drops during the early part of the equalization process and for most of the process is typically a few percent of the normal charging current. Thus, the electrical power required for equalization is a small fraction of the power normally required for charging.

Finish charging and equalization of lead-acid batteries, and the complete discharge of a nickel/cadmium or zinc/bromine battery are all examples of battery management procedures, as defined in this invention, that, if properly done, will help maximize the life of the battery, but are not necessary for satisfactory short-term operation.

A specific example of an electric system for which the current invention may find utility is a solar hybrid system. Solar hybrid systems are increasingly used to provide power to electricity end-users at locations that are remote from the transmission and distribution systems of utilities. The design of a solar hybrid system is much like the generic electric system shown in FIG. 1, with the DC generator 12 being a solar photovoltaic (PV) array and AC Source 10 being a fossil-fueled engine-generator. A controller 70 senses the system requirements and capabilities and controls the components in a manner well known in the art.

Lead-acid batteries are frequently used in solar hybrid systems. Each battery system consists of a number of 2 volt cells, or 6 volt (three-cell) or 12 volt (six-cell) modules, connected in series to form a string having a useful output voltage. Most solar hybrid systems use a plurality of cells or modules in a series string to provide a sufficient output voltage. In order that the battery system has adequate capacity to cover relatively long periods without solar energy and without having to turn on the generator (for example: long winter nights) most solar hybrid systems use a plurality of strings in parallel.

The operation of a typical solar hybrid system is as follows: on a sunny day, direct current (DC) from the photovoltaic array 12 (the PV) is provided to the power conversion equipment 14 and 26, which may convert it to a different DC value and then to alternating current (AC) to power the load, or the excess energy at the different DC value may be used to charge the battery. If there is not enough solar energy to generate sufficient output from the PV, or at night when the sun is down, the load 60 is supplied with energy from the battery 1. When the battery 1 needs charging, the generator 10 supplies the load and recharges the battery 1. The generator 10 is turned off when the battery 1 is filly charged. From an operating maintenance cost standpoint, energy from the PV 12 is least expensive; supplying energy to the load from the storage battery I is more expensive because of the inefficiency of the battery and because use degrades the life of the cells; and operation by generator 10 is most expensive since a suitable high-grade fuel must be provided and the generator requires periodic maintenance. Furthermore, utilization of a generator at a small fraction of its power capability is particularly expensive since a generator is often inefficient under this operating condition and requires more maintenance.

During discharge mode, if solar energy is not available, the battery 1 (Strings A and B) provides the power for the user's electrical loads 60 via power conversion equipment 26 that converts DC to AC. If solar energy is available, the PV 12 may provide some or all of the power for the user's loads, and at times, the PV may be providing more power than needed by the customer, so that the battery becomes partially recharged even though in the discharge mode. When the battery voltage reaches a preset lower level, as measured by the power conversion equipment, the generator 10 is started so that the battery can be recharged. However, since all the strings of the battery are connected in parallel in current systems, as illustrated in FIG. 1, there is only one battery voltage that can be measured. Moreover, the battery voltage depends on the power that is being withdrawn from the battery, and the average discharge power is typically quite low in solar hybrid systems. Thus, the threshold for charge to be initiated may be reached during periods of high power demand. The consequence of these factors means that cells and modules within the battery can be discharged to a much greater extent than intended, with a resulting deleterious effect on battery life.

For much of the charge time with the AC source (the generator) 10, i.e., the bulk charging period, the lead-acid battery of this example (as with batteries based on other chemistries) can accept charge efficiently at almost any power level that can be provided by the source of charging energy. However, towards the end of charge, the effective resistance of the battery (defined as the ratio of the excess voltage required to pass the charging current to the charging current) increases and the efficiency of recharge (the fraction of the current being applied that increases the real state of charge of cells) decreases. The power conversion equipment 20 (acting as an AC to DC converter during battery charge) is set to reduce the charging current near the end of charge so that the charging inefficiency does not become too large. Charging is terminated when the charging current reduces to a preset lower limit, but it is not allowed to proceed for too long since the. generator is not efficient when the power is being produced below it's rated value. As a result of this termination criteria, charging is usually not completed to a level recommended by the battery manufacturer, and the battery must be equalized periodically in order to ensure that capacity is not permanently lost. Any solar energy that is generated by the PV during finish charge or equalization by the generator cannot be used effectively and is lost, leading to further inefficiency. As a consequence of all these factors, more fuel is used by the generator than if the battery did not require finish charging and equalization, and the generator must be subjected to maintenance more frequently because it runs for a long period of time at low power. In addition, the equalization process itself and any failure to frequently complete finish charging both lead to a shorter life for the battery than would be expected under optimal charging conditions.

The deleterious effects of sub-optimal charging and discharging, as described above, are exacerbated by the fact that neither individual cells nor individual modules are identically constructed, so some cells and modules: 1) accept charge more efficiently during the finish charge; 2) discharge at higher voltage; as compared to other cells and modules; 3) some cells deteriorate at a faster rate than other cells. Since one bad cell may cause a battery to fail, it is desirable for efficient use of a battery system that the battery be charged and discharged in an optimal way.

RELATED PATENT INFORMATION

The definition of equalization and finish charging frequently discussed in other patents is not the same as that used in the current document.

A more thorough explanation of the need for battery equalization may be found in U.S. Pat. No. 5,504,415 of Y. Podrazhansky et al., which patent discloses a system for equalizing individual batteries in a series string of batteries by shunting charging current around cells based on cell temperature. According to our definitions, the process of this patent would be called finish charging.

U.S. Pat. No. 5,905,360 of S. Ukita discloses an equalization system for a hybrid vehicle which uses a generator to equalize all modules in a series string, and then uses fully charged modules in the string to transfer charge to less fully charged modules. The load is not powered by the battery while this transfer is occurring, thus the battery system is not available to the load during the equalization procedure. Again, the process being accomplished here is what we would call finish charging.

Another system for equalizing a battery is shown in U.S. Pat. No. 6,150,795 of N. Kutkut et al, where battery charge equalization is carried out utilizing modules connectable in staggered relation between pairs of batteries in a series connected string of batteries. The device disclosed in this patent is commercially known as PowerCheq™, a product of PowerDesigners, LLC of Middleton, Wis.

SUMMARY OF THE INVENTION

It is an object of this invention to provide a method for optimally charging and discharging multi-string batteries in electric systems so that battery life is maximized and the performance of the system of which the batteries form the storage component is also maximized.

To achieve the foregoing and other objects, and in accordance with the purpose of the present invention, as embodied and broadly described herein, this invention is a method of optimally managing battery strings in an electric system for continuously powering the load, with at least two battery strings for selectively powering the load, and an electrical AC source for selectively powering the load and charging the battery strings. The method includes the processes of charging mulitple battery strings with the AC source; management of one battery string while the other battery strings power the load and without using the AC source; powering the load with all battery strings, without using the AC source, until discharge is deemed optimally complete; bulk charging all the battery strings using the AC source; and the sequential management of each battery string while the remaining battery strings power the load and without using the AC source. Alternately, the method includes the processes of charging multiple battery strings with the AC source; the sequential management of each battery string while the other battery strings remain available to power the load if necessary. As yet another alternative, the processes of charging multiple battery strings with the AC source; powering the load with all battery strings, without using the AC source, until discharge is deemed optimally complete; management of one battery string while the other battery strings are being charged using the AC source; completing the charge of all battery strings with the AC source; and then sequential managing each of the battery strings. Management may include finish charging, equalization, or total discharge, depending on the situation and battery type.

BRIEF DESCRIPTION OF THE DRAWINGS

The accompanying drawings, which are incorporated in and form part of the specification, illustrate the present invention and, together with the description, serve to explain the principles of the invention.

DETAILED DESCRIPTION OF THE INVENTION

Figure 3:
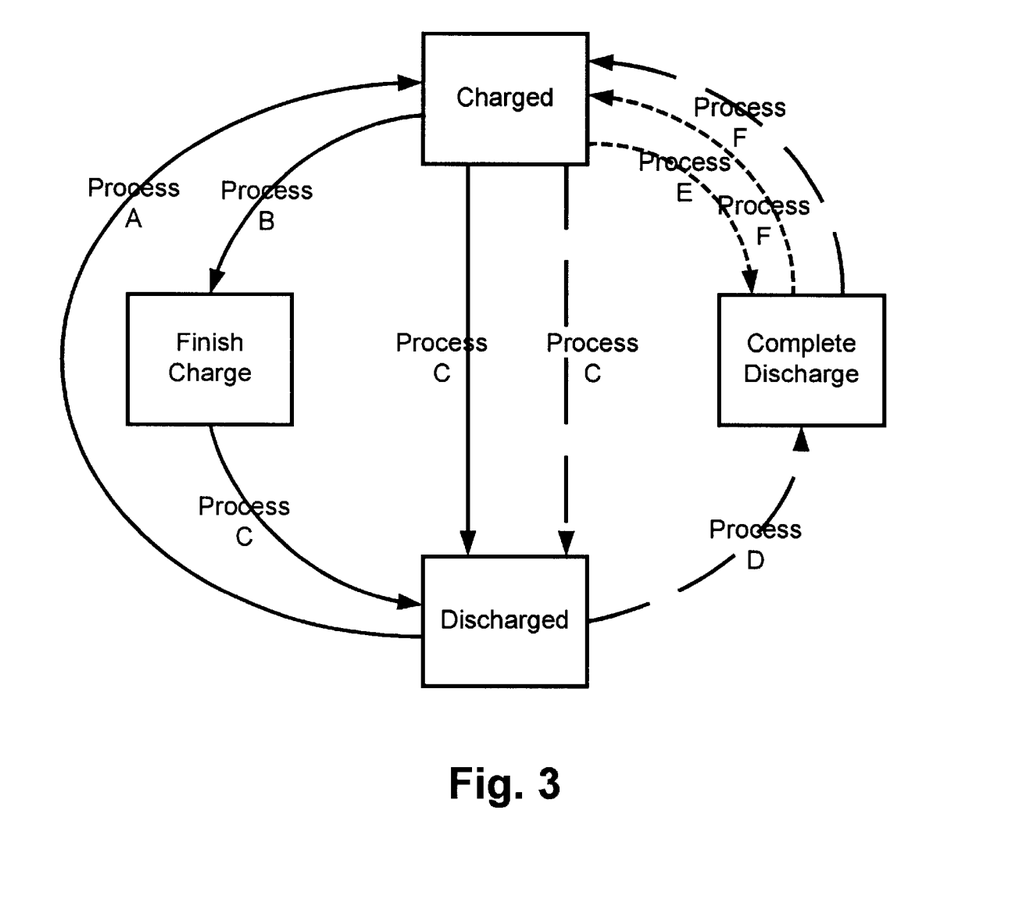
FIG. 3 shows the several processes implemented in the practice of the invention.

The method by which batteries are optimally charged and discharged consists of several sets of processes, with different battery chemistries requiring different sets of processes, together with the equipment for implementing the processes. The processes involved in practicing the method are shown in FIG. 3.

For lead-acid batteries in hybrid power systems for which frequent finish charging is advantageous, and other batteries with similar characteristics, the set of processes A, B, and C (shown as a sequence of solid lines in FIG. 3) are applicable. Process A involves charging all the strings of the battery in parallel. Process B involves finish charging one string while discharging all but the finish charging string in the battery. Processes C involves discharging all the strings of the battery in parallel.

For nickel/cadmium batteries in uninterruptible power supplies, in which the battery is kept fully charged most of the time but infrequent complete discharges are necessary for maximizing battery life, and similar batteries and systems, the set of processes E and F (dotted lines in FIG. 3) are applicable. However, this sequence of processes is only applied occasionally, as required, with the battery strings being discharged and recharged without use of the invention at other times. Process E involves completely discharging one of the strings of the battery while keeping the other strings available to power the load if necessary or advantageous. Process F involves recharging the string that has been completely discharged and charging the remaining strings as necessary.

For zinc/bromine batteries in applications where the battery is frequently deep cycled, as in the case where the battery is used for matching the load and the supply in electric systems with a generator, such that infrequent complete discharges are necessary for maximizing battery performance, and similar batteries and systems, the set of processes C, D and F (dashed lines in FIG. 3 and solid line process A) are applicable. The processes D and F (dashed lines) are only applied occasionally, as required, with the battery strings being discharged (process C) and recharged (process A) without use of the invention at other times. Process D involves completely discharging one of the strings of the battery while recharging the other strings using process A. Process F involves recharging the string that has been completely discharged and completing the charge of the remaining strings as necessary.

The implementation of the foregoing sets of processes will now be described.

Figure 4:
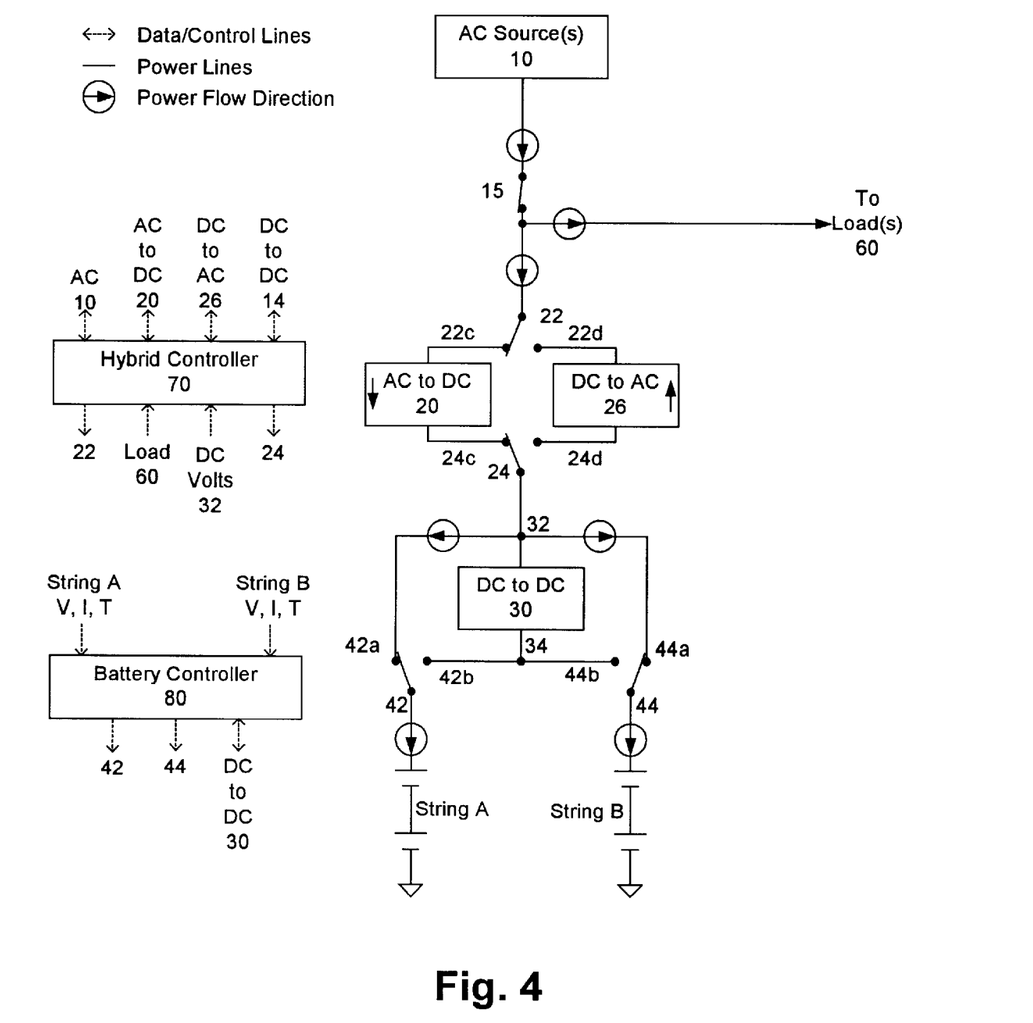
FIG. 4 shows a generic electric system with a first embodiment of the invention during process A of FIG. 3.

FIG. 4 shows a generic electric system according to this invention designed to power AC loads 60 with the source of the power being either an AC source 10 or one or both of the two parallel Strings A and B of lead acid cells that constitute the storage battery. Much of the circuit is similar to that shown in Prior Art FIG. 1. A series switch 15 selectively connects and disconnects source 10 from load 60 and from double throw switch 22. Switch 22 selectively connects to the AC ports of AC-DC converter 20 and DC-AC converter 26. Contact 22c of switch 22 is connected to the input of AC/DC converter 20, the output of which converter is connected to contact 24c of double throw switch 24. The input of a DC/AC converter 26 is connected to contact 24d of switch 24, and the output of converter 26 is connected to switch 22d of switch 22. The combination of switches 22 and 24, and converters 20, 26, functions as bi-directional inverter/converter. There are several commercially available products, such as the Xantrex, Trace Engineering SW4000, that can provide the combined functionality of 20 and 26 and switches 22 and 24.

For the purpose of this patent, the description will be based on the individual components in order to more easily explain the operation of the invention. However, any component or combination of components known to those of ordinary skill which performs the functions identified for these components may be utilized in the practice of the invention. The equipment described above represents currently practiced art for electric systems. The additional components described below are utilized in the practice of this invention.

Switch 24 is connected to the input 32 of a DC/DC converter 30 and to the contacts 42a and 44a of single pole, double throw switches 42 and 44, respectively. Contacts 42b and 44b are each connected to output 34 of converter 30. Switches 42 and 44 are connected, respectively, to battery Strings A and B, which together constitute the battery. Converter 30 transforms the DC voltage from one battery string to a higher voltage for finish charging the other string, as set forth hereinafter. The switches 42 and 44 may be either electromechanical relays or switches built from combinations of semiconductors, or other known devices. The use of combinations of semiconductors rather than relays allows the magnitude as well as the direction of the current to be controlled. It is the interconnection of these components, and their use in combination as set forth hereinafter, that is the invention.

The example of FIG. 4 accomplishes several goals: optimally manage each battery string even though charge power may not be available at an appropriate time or though the discharge requirements of the user may not match the optimal delivery capabilities of the battery; minimize use of AC source 10; subject each battery string to equal charge-discharge cycles; subject each string of the battery to frequent finish charges of adequate duration; discharge and charge each string in a manner conducive to extending battery life; and provide a means for equalization of the battery without have to use the AC source 10 in a non-optimal way.

A battery controller 80, which is part of the current invention, receives inputs representative of the voltage V, current I, and temperature T, of each battery string; and provides output commands to set each of switches 42 and 44. The implementation of this control system with a microprocessor and controllers, or other equivalent equipment, to accomplish the goals of the invention, as set forth hereinafter, is a routine matter for one of ordinary skill in the art.

FIG. 4 shows the configuration of the system, in process A, with both Strings A, B of the battery being charged by the AC source 10 immediately following a discharge event. As with prior art systems, switch 15 is closed and switches 22, 24 are set to the charge ('c') position, so that AC power from AC source 10 is converted to DC by converter 20 and applied to charge battery String A through switch contact 42a and to charge battery String B through switch contact 44a. AC power from AC source 10 is also applied to load 60.

The charge continues with the system in the state shown in FIG. 4 until the voltage regulation value for the battery strings is reached and the current begins to taper. As indicated in FIG. 2, at this point, the finish charging period is deemed to have begun. The voltage regulation value is determined by voltage and current measurements on each string, or, in other words, by a measure of the effective resistance of each string. Since Strings A and B are connected in parallel through switch contacts 42a and 44a at this time, the voltage applied to each sting is the same, and there is no danger of overcharging one string with respect to the other.

It is one of the objects of the current invention to minimize the period of finish charging with the AC source so as to maximize system efficiency. This can be done without deleterious effect on cell life because of the finish charging method which is shown in FIG. 5.

Figure 5:
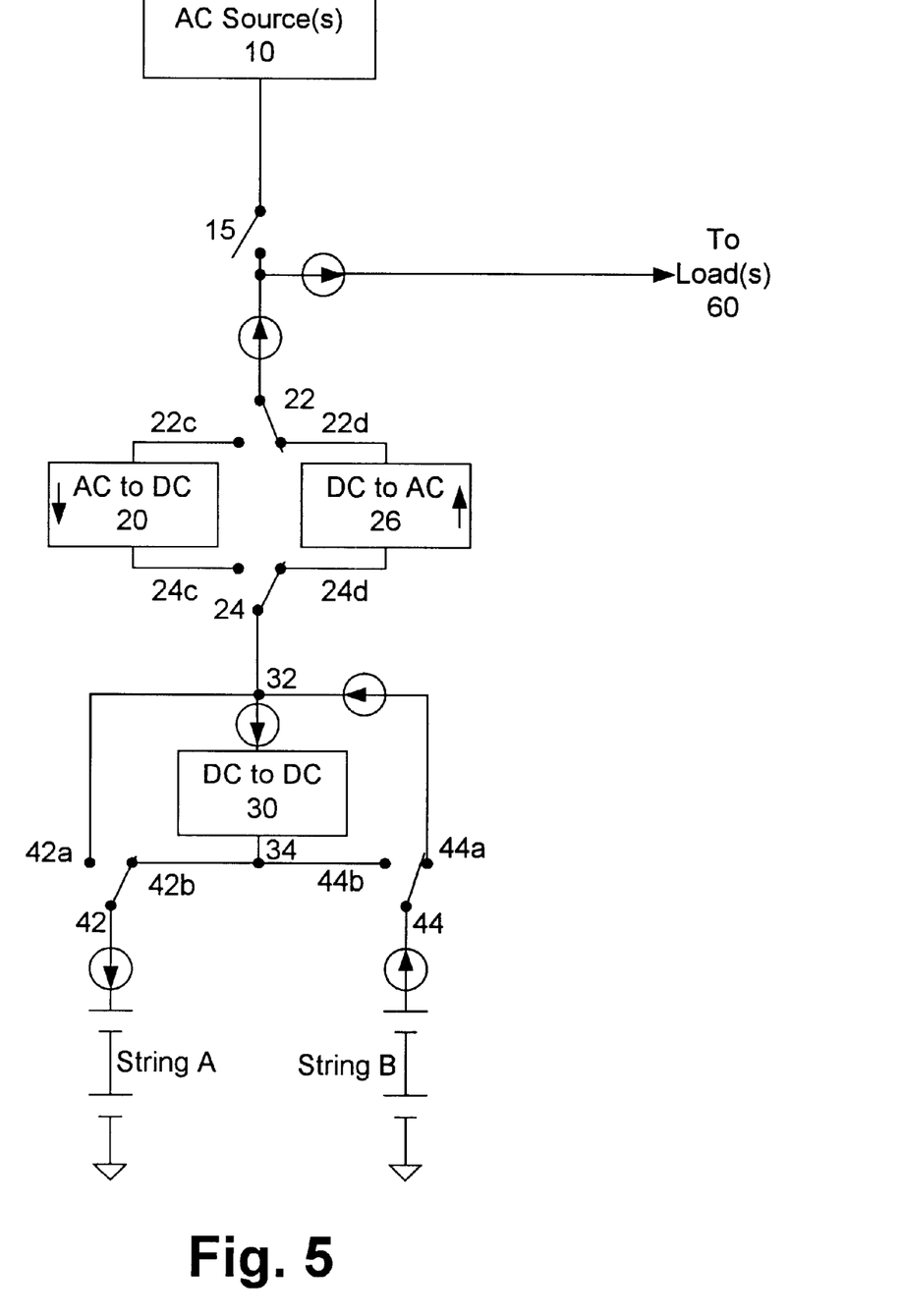
FIG. 5 shows the generic electric system of FIG. 4 during process B of FIG. 3.

FIG. 5 shows the configuration of the system, in process B, after charging of both battery strings is deemed complete, as determined by voltage and/or current measurements on each string.

Converter 26 now acts as a DC-AC converter, so switches 22, 24 ate set to the discharge ('d') position, switch 42 is set to 42b position, and load 60 is powered by one battery string (String B, as illustrated) through contact 44a and DC-AC converter 26. Switch 15 has opened and AC source 10 is not being used. The other battery string (String A, as illustrated), is finish charged in process B, by power from string B, as voltage from String B is up-converted or boosted by the DC-DC converter 30 and applied through contact 42b to String A. In this manner, String A receives a lengthy finish charge from String B, without the inefficient use of AC source 10.

Finish charging continues with the equipment configured as shown in FIG. 5 until the Battery Controller 80 determines that String A has been adequately finish charged. The finish charge of any string is terminated when one of two predetermined conditions is met: a) the current tapers below a minimum preset level; or b) the string being finish charged (String A in this example) has been overcharged by a small preset amount, generally in the range of 10% of the ampere-hours discharged from the string immediately prior to the charge in progress. Other conditions for determining when to terminate the finish charge are also contemplated in the practice of the invention.

Figure 6:
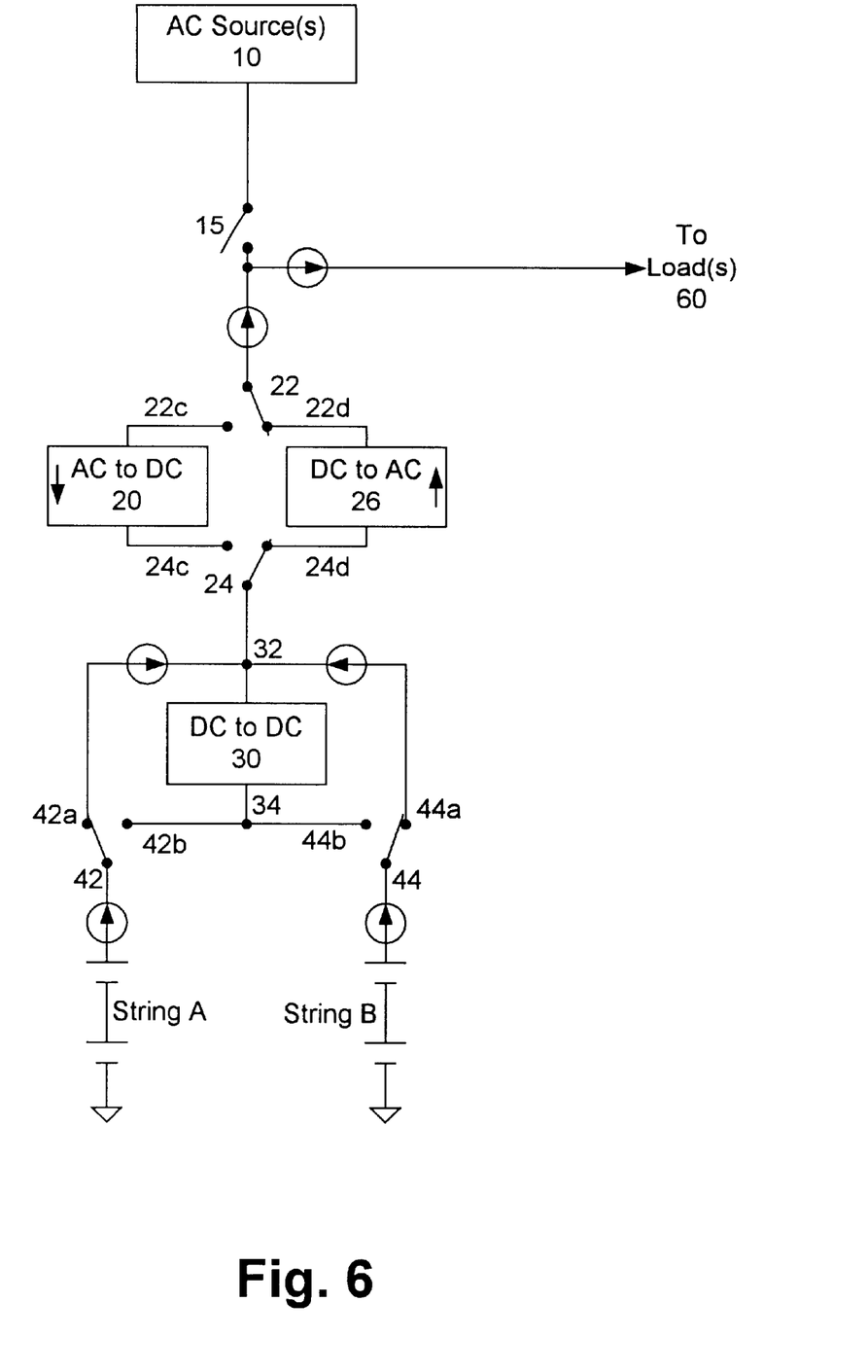
FIG. 6 shows the generic electric system of FIG. 4 during process C of FIG. 3.

FIG. 6 shows the configuration of the system after the conditions for ending the finish charge of battery String A have been met. At this time, String B is somewhat discharged from having powered the load while also finish charging String A, which is fully charged. Both strings are now utilized in process C to power load 60, as switches 22, 24 remain in the discharge position and switch 42 has changed back to contact 42a. This configuration will be maintained until controller 70 senses that the battery, both strings A and B, has reached a predetermined depth of discharge (DOD). This method ensures that none of the cells in either Sting A or String B will be over-discharged, and is an inherent advantage of the invention.

After discharge is seemed complete, the system returns to the process A configuration of FIG. 4. However, after both battery strings have been charged and the system switches to the embodiment of FIG. 5, switch 44 closes contact 44b and switch 42 remains at contact 42a, which lets the other String A power load 60 and finish charge String B. In this manner, each string of the battery is finish charged on a regular, repetitive, basis.

While the embodiments of this invention show two battery strings A and B, it should be understood that the invention may be practiced with any number of parallel battery strings. With more than two battery strings, the system operates on the string being managed in the manner described herein, while a subset or all of the remaining battery strings perform the function described herein for the string that is not being managed. That is, if string A is being managed, in a multi-string embodiment all strings except string A could provide power. And while the two string embodiment has each string being managed (e.g. finish charged) on alternating cycles of the system, a multi-string embodiment could first manage string A, and then manage a different string on each succeeding cycle until all strings had been managed, before managing string A for the second time. Alternatively, if there were a sufficient number of strings to provide management power, two or more strings could be managed successively during each cycle. Furthermore, there may be instances where it is desirable to manage one string more often than other strings. Also, with a sufficient number of strings, one string could be finish charged by a second string while the remaining strings power the load. A constant in all such scenarios is fact that the primary AC source is not used for string management, and that the load is powered by battery strings while other strings are being managed.

Figure 7:
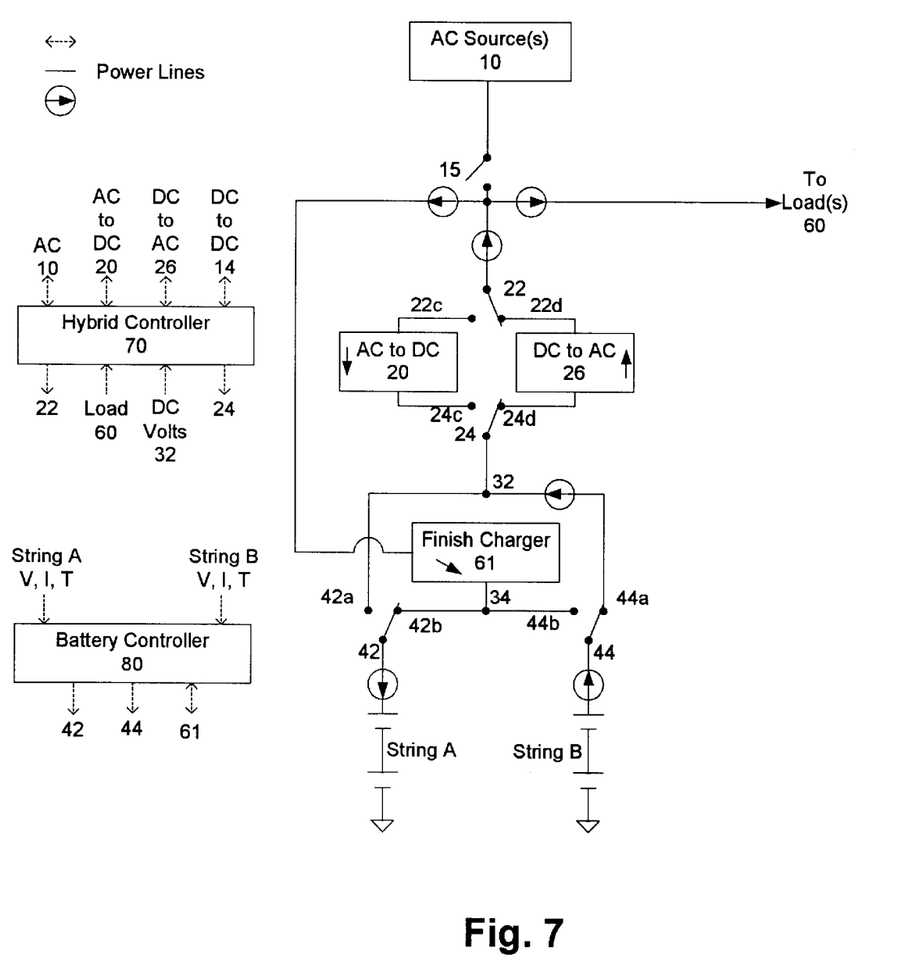
FIG. 7 shows a general system with a second embodiment of the invention during process B of FIG. 3.

An alternative method for accomplishing finish charging electric systems is shown in FIG. 7. In this Figure, finish charging is accomplished with a separate AC-powered battery charger 61 which eliminates the need for the DC-DC converter 30. In charge mode this alternative operates in the same way as the example shown in FIGS. 3, 4 and 5; charge continues until current and voltage measurements on each string indicates that charge can be deemed complete. Then Switches 22, 24 are set to the discharge position and load 60, including Finish Charger 61, is powered by one battery string (String B as illustrated in FIG. 6) through contact 44a and DC-AC Converter 26. On a subsequent cycle, the other battery string (String A as illustrated) is finish charged by power from the other string through the DC-AC converter 26 and the Finish Charger 61. Finish charging, discharging, and charging are then accomplished in sequence as in the previous example.

It should be readily understood that this invention is easily expanded to cover more than two battery strings. In that case, two or more strings could function in parallel as the charging string in FIG. 5 (or alternatively in FIG. 7) and all strings would be individually finish charged as set forth in FIGS. 4 (or 6) on a sequential basis.

Figure 8:
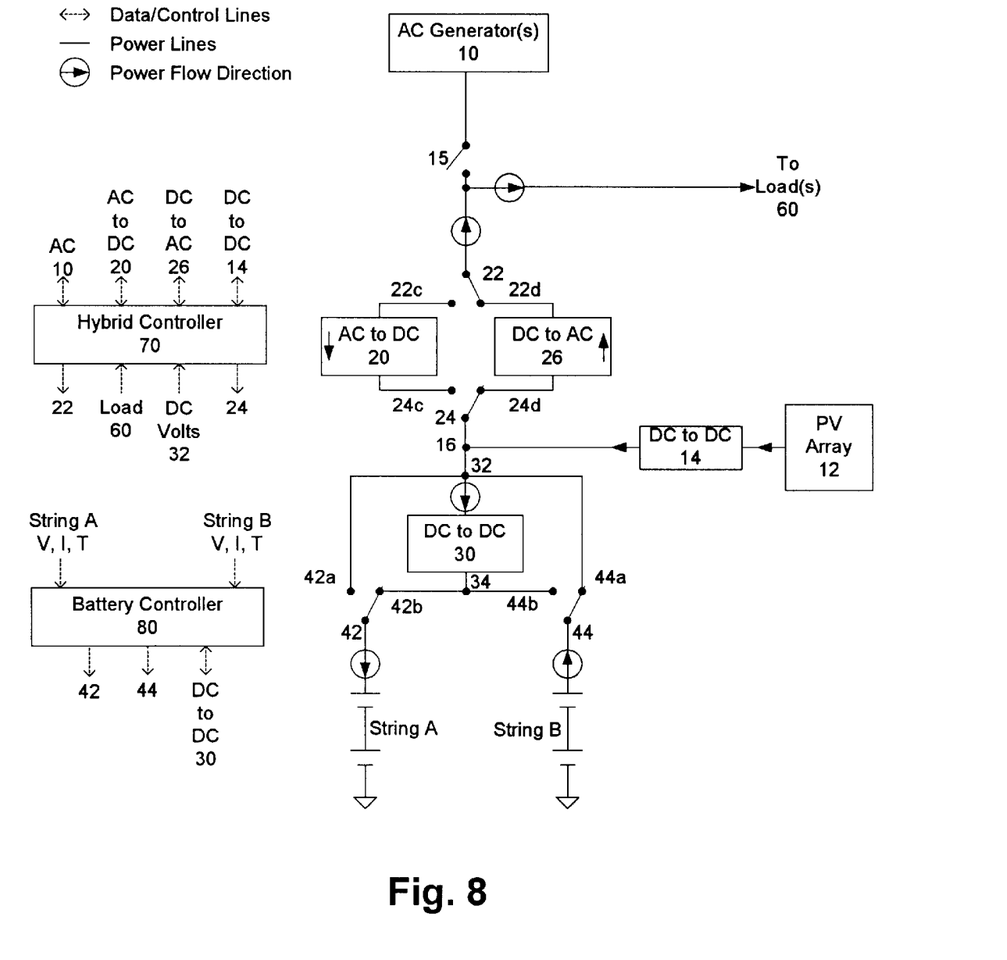
FIG. 8 shows a solar hybrid system with the first embodiment during process B of FIG. 3.
Figure 9:
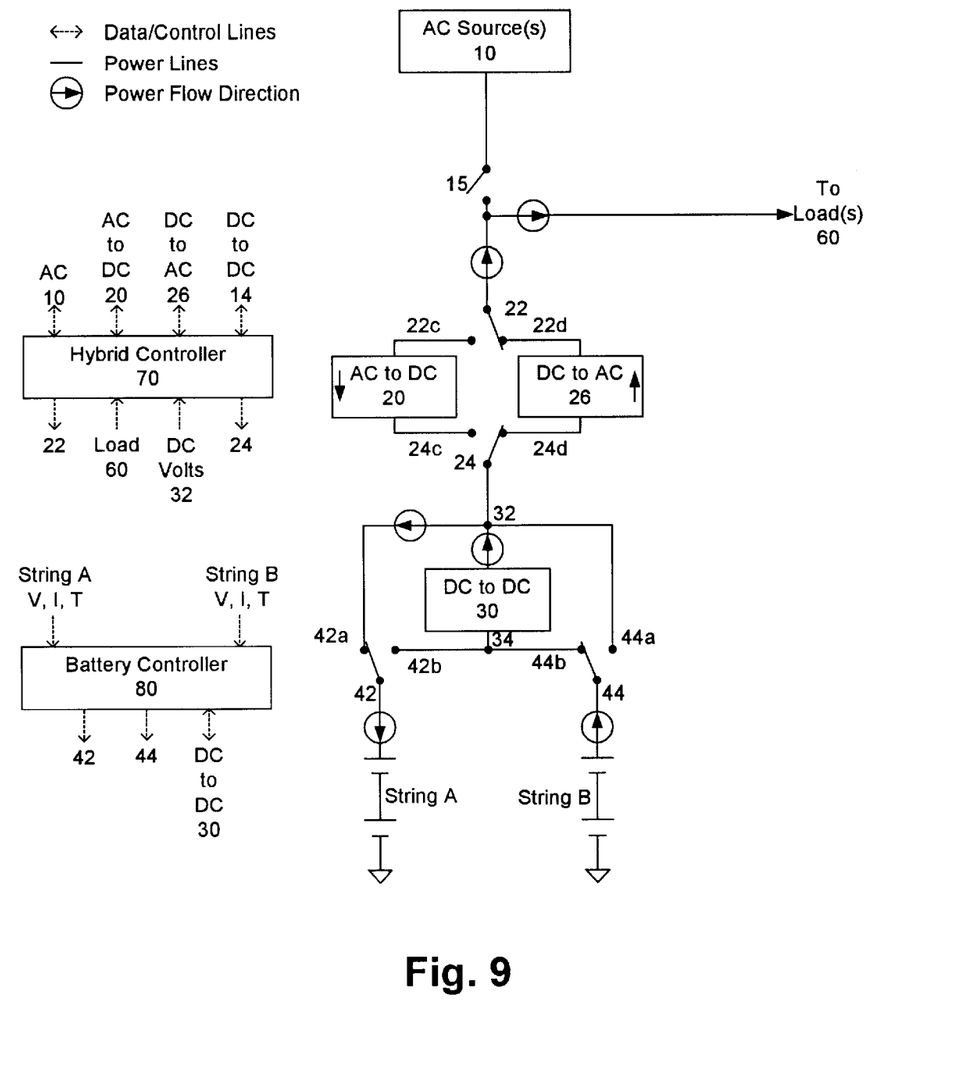
FIG. 9 shows an uninterruptible power supply with a zinc/bromine battery with the object equipment of the invention during an alternate process D of the invention method.

For solar or other renewable hybrid systems with lead-acid batteries, such as that shown for process B in FIG. 8 this invention provides a means to "de-couple" the process of finish charging the battery from operation of the generator. In addition, the photovoltaic array in solar systems can be used for both load support and finish charging the battery, unlike current practice in solar hybrid systems. Without the invention, finish charging is currently accomplished utilizing the generator 10. Under this circumstance, any power produced from sunlight striking the PV array cannot be utilized, since the finish charging process must be controlled with AC-to-DC converter 20. Also, the battery can be made "smart" in relation to the loads and the solar incidence that are expected for the solar hybrid system. These three items in combination mean that the utilization of the solar energy can be maximized and that operation of the generator can be minimized. This operating strategy results in reduced fuel consumption by the generator and less required maintenance on the generator. In addition to the benefit regarding the generator, the fact that generator use is decoupled from finish charging means that the latter will be conducted more regularly, with the result that battery life is expected to be extended.

As another example of the utility of our invention, the method illustrated in FIGS. 3, 4 and 6 (or alternatively that shown in FIG. 7) can be used to equalize the battery if such proves necessary. Since this invention involves frequent and complete finish charging, it is thought that equalization will be unnecessary. However, in the event that equalization is found necessary, or if the system needs are such that finish charging cannot be conducted frequently, then the methods illustrated in FIGS. 5 or 7 can be used. In the case where equalization is desired, the battery would be charged to regulation voltage; the charge would be terminated as discussed above. Then, at a time when the loads to be supplied by the battery are expected to be small for a long period of time, the configuration shown in FIG. 5 (or that of FIG. 7) could be used to supply the small current required for equalization from one string(s) to the other string in the battery, while the other string(s) would also be used to supply the load. The various strings in the battery would be equalized in sequence in subsequent discharge/charge cycles, as described above. The main difference between finish charging as described in the first and second examples above, and equalization, is that finish charging would be accomplished on all the strings every few days, whereas equalization would be conducted on 6-monthly or yearly basis. The invention can be particularly advantageous for solar hybrid systems, FIG. 8, if equalization does prove to be required, since it is during this process that a significant amount of solar energy must otherwise be thrown away.

Furthermore, if batteries are used that periodically require a complete discharge in order to maintain their maximum efficiency, such as zinc/bromine (stripping) and nickel/cadmium (erase memory), then the circuit shown in FIG. 8 may be used with process E, or alternatively process D might be used. According to this approach, process A (bulk charging) would be conducted as described above with switches 22c, 24c, 42a and 44a closed. When charge would be deemed complete, switches 22c and 24c would be opened and switches 22d and 24d would be closed, so that the two strings together would be discharged to power the load, according to process C. After the end of the discharge period, the battery would normally be recharged according to process A. During a period of relative battery inactivity, either battery string may be completely discharged in process D or process E by utilizing the DC-DC converter to take energy from the string being completely discharged and converting it to a voltage at which it can power the load. Alternatively, not shown in FIG. 8, the energy from discharging the string being completely discharged can be used to charge the other string, if the load is not requiring power from the battery at the time. When the string is completely discharged, as measured by controller 80, that string will be recharged by AC source 10 during the next charge cycle of the battery strings. As an alternative circuit to that shown in FIG. 8, the invention may provide a resistor which may be connected through switch 42 or switch 44 to either or neither battery string, that will then permit complete discharge of the string that is connected.

The benefits that can be provided by practice of this invention have been demonstrated in two ways: by simulations using a computer model and by measurements on a battery storage system that includes the equipment needed to practice the invention.

The invention was simulated with a computer model using the characteristics of one of the lead-acid battery types that has been incorporated into developmental solar hybrid systems, and using the fuel consumption characteristics of a generator that has been used in a solar hybrid system field test. The model did not include a simulator for a solar PV array since the availability of solar energy is unpredictable and therefore difficult to model. Rather, the model was for a generic electric system of the type illustrated for processes A, B and C in FIGS. 4, 5 and 6. The system modeled thus included a two-string battery, a power converter, a fossil fuel generator, and a fixed unvarying load. The software for the model was set up so as to simulate operation in just the way described above for FIGS. 4, 5 and 6. The simulations showed that operations of the equipment included according to the invention meant that the generator ran for significantly less time, 28% less according to one set of inputs, than would have been possible had the method of the invention not been used. Had a solar array been included the model, such as illustrated in FIG. 8, there would have been less fuel consumption and an even greater decrease in the run time of the generator, as compared to the situation without our invention. It can be inferred from the modeling that finish charging would be much more likely to be implemented for a system with the invention than without, because of the lower usage of the generator that the invention makes possible. As a result, the simulations indicate that battery capacity is more likely to be maintained for long periods without equalization, as compared to the case without the invention. Those skilled in the art would conclude that the life of the battery would be longer when the invention is used, as compared to situations where it is not.

Figure 10:
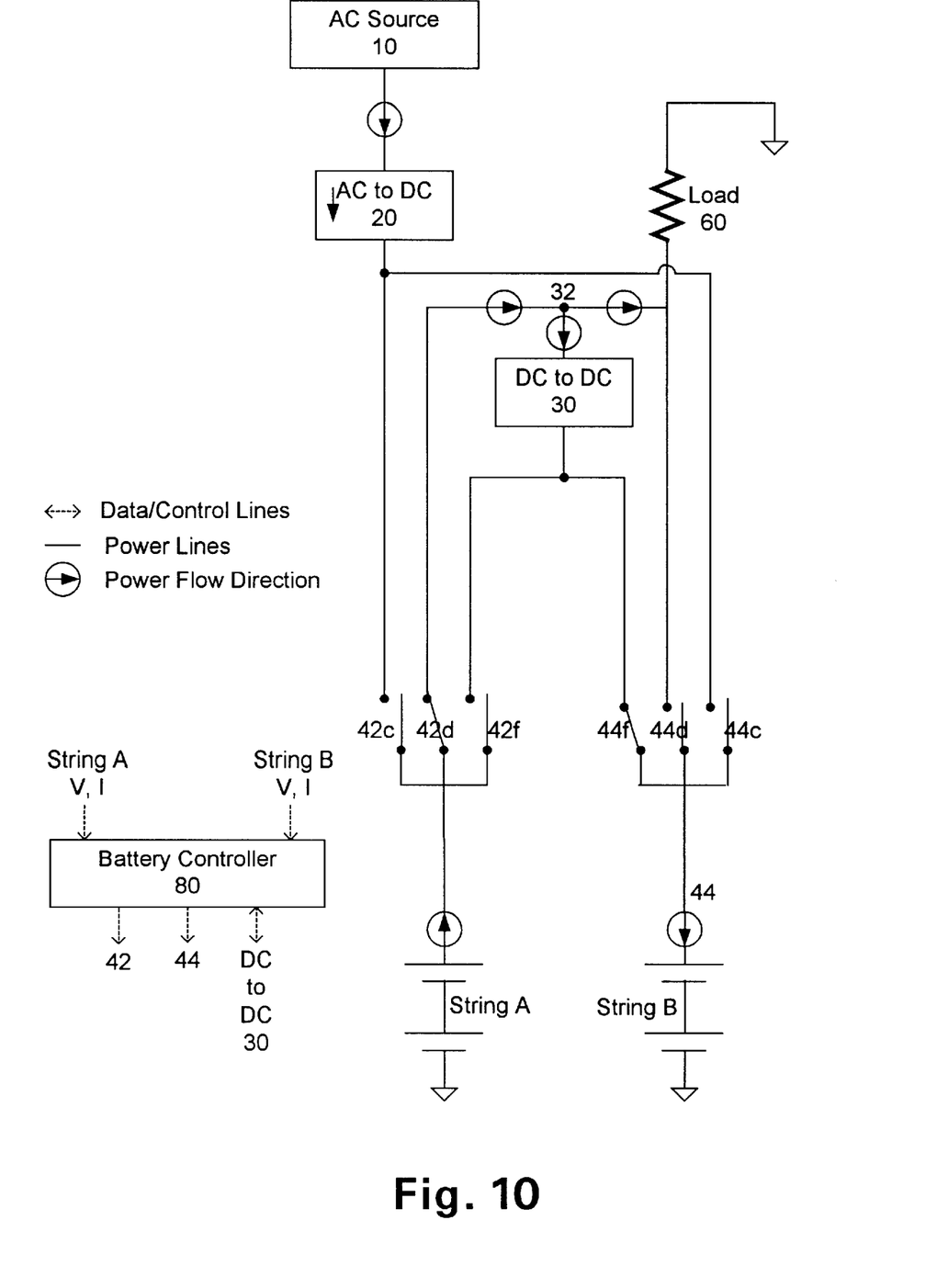
FIG. 10 shows experimental setup for testing the invention with alternate object equipment of the invention during process B of FIG. 3.

A group of experiments to demonstrate the benefits that may be realized from practice of this invention were performed with the equipment shown in FIG. 10. This consisted of two strings of modules, String A and String B, each with two Trojan T105 6 V battery modules with a rated capacity of 225 ampere-hours. The two strings were connected via semiconductor switches 42c and 44c to a 12–15 V, 40 amp battery charger acting as an AC-to-DC converter 20; via semiconductor switches 42d and 44d to a bank of resistors connected to ground, which thereby acted as load 60, so as provide a sink for current of 26 to 30 amps, depending on string voltage; and via semiconductor switches 42f and 44f to a 12 V DC to 15.5 V DC converter to provide power for finish charging from one string to the other. In FIG. 10, the switches are shown for process B of the invention. The semiconductor switches were actuated by means of a battery system controller, like that shown schematically as 80 in FIG. 10, which consisted of a personal computer equipped with a data acquisition board. The data acquisition board could, upon instruction from the software written to practice the invention, provide digital signals to actuate the semiconductor switches, thereby allowing operation according to the method as described above.

Figure 11:
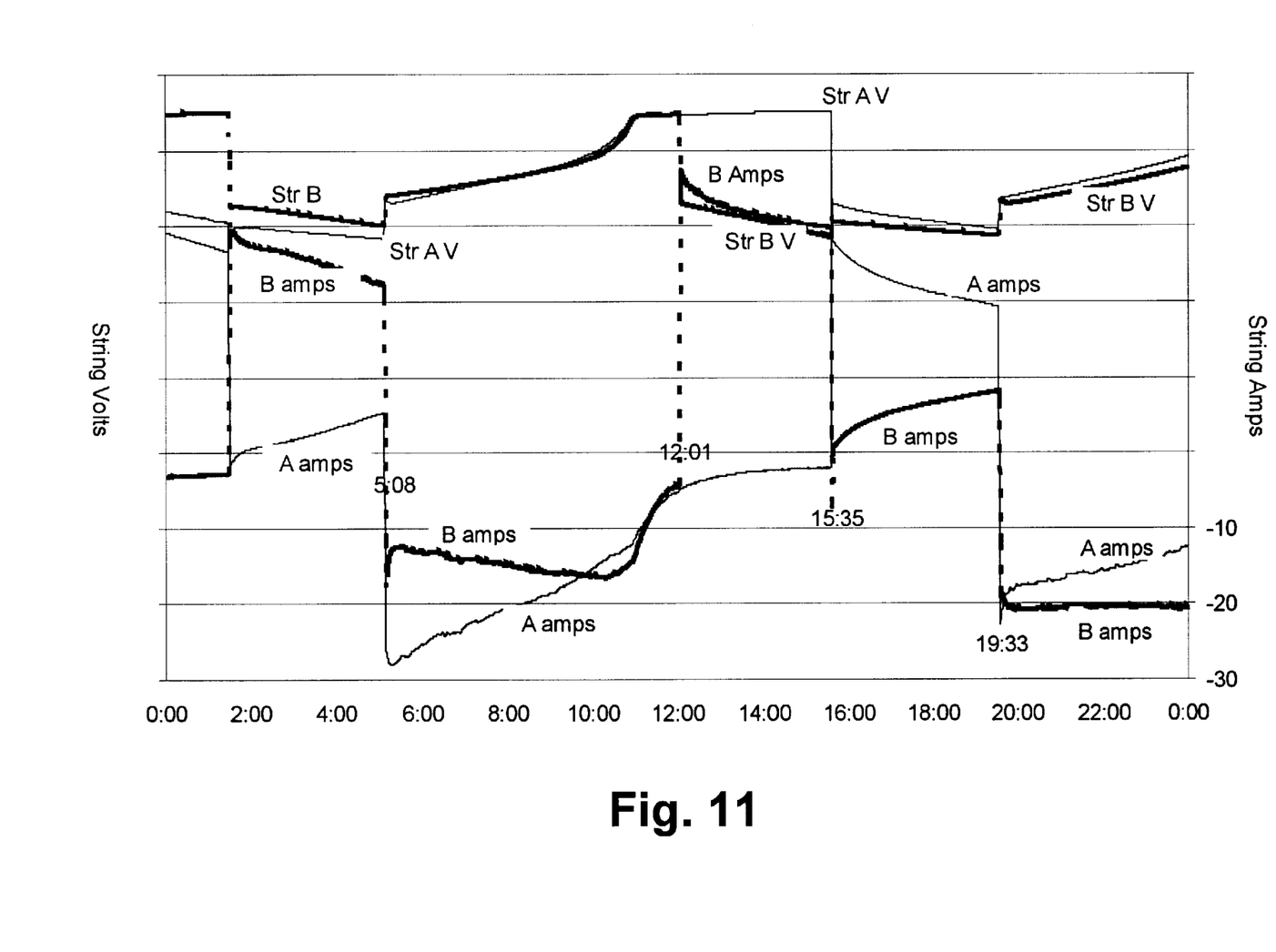
FIG. 11 shows test results for the test electric system shown in FIG. 10.

FIG. 11 shows a plot of the string voltages and string currents versus hour of the day for one 24-hour day of a seven-day test of the battery system described in the last paragraph. Throughout the period of the test, the battery was under automatic control according to the method of our invention. The change from discharging both strings to charging both strings can be seen to have occurred at 05:08 hours, after which the string voltages were approximately equal until the end of charge when regulation voltage was reached and the current began to taper. The change from charging both strings to discharging String B and finish charging string A at 12:01 hours can be clearly seen.

During the finish charge of String A which continued for approximately three and one half hours until 15:35 hours, 10% more capacity had been returned over that discharged from String A in the preceding discharge, the current continued to taper down, indicating that the String A had not been fully recharged in the preceding bulk charge period. The change to discharging both strings at 15:35 hours is also obvious in FIG. 7, with the currents flowing from String A and String B trending towards being equal through the discharge period. The discharge was continued until the two strings had collectively been discharged to 50% of the nominal capacity, according to the method taught by the present invention. The discharge was complete at approximately 19:00 hours.

An investigation and evaluation of plots similar to that shown in FIG. 11 for other days in the test, and for other tests that were performed, indicates that similar or identical results were obtained for other cycles and other tests. The advantages of our method for optimally charging and discharging batteries is obvious from these results.

The applicability of these advantages to solar hybrid systems, which typically use lead-acid batteries as the energy storage element, would be obvious to those skilled in the art. However, there are other systems that either are required to or would benefit from operation for long periods or continuously at an intermediate state of charge. For such systems, the invention allows for optimal charging and discharging even within the limitations of the customer's needs for discharge power or the timely availability of power for recharge.

For lead-acid batteries, completing charges with a finishing charge relatively frequently is advantageous in extending the life of the batteries. For other types of batteries, for example zinc/bromine batteries or certain nickel/cadmium batteries, fully discharging individual strings relatively frequently is necessary. This currently recognized benefit cannot be quantified at present. Nevertheless, as discussed above, the method of our invention can be used for optimal charging and discharging of batteries based on chemistries other than lead-acid.

The particular sizes and equipment discussed above are cited merely to illustrate a particular embodiment of this invention. It is contemplated that the use of the invention may involve components having different sizes, capacities, and shapes as long as the principle of optimally charging and discharging the battery even when the power requirements of the application do not alone permit this is followed. For example, a 20 MW battery system in Puerto Rico, with 6 strings of 1000 cells in a series in each string, is operated so as to provide frequency regulation and rapid reserve for that island's electric system. In this application, the battery must be held at an intermediate state of charge for most of the time. A lead-acid battery has been used as the energy storage component of the Puerto Rico battery system. The battery in this situation would have benefited from the method of our invention, since it would have allowed more optimal charging and discharging without interfering with the customer's requirements for discharge and capabilities for recharge. Clearly, much larger capacity switches, and measurement transducers appropriate to the size of the battery would be required for this application, but the switches and the data would be managed in the same way as described above.

Additional objects, advantages, and novel features of the invention will become apparent to those skilled in the art upon examination of the preceding description or may be learned by practice of the invention. The applicability of the invention to storage batteries based on other chemistries, and for other applications in which there is an opportunity for optimally charging and discharging may also be apparent upon examination of the following to those skilled in the art. The objects and advantages of the invention may be realized and attained as particularly pointed out in the appended claims.

We claim:

1. In an electric system for supplying uninterrupted electric power to a load, the system having at least two battery strings and a primary AC power source, a method of optimally managing the battery strings and using the primary source efficiently comprising:

powering the load and charging all battery strings with the primary AC source;

managing one battery string while the load is powered by at least one other charged battery string and without using the primary AC source;

powering the load with at least one battery string, without using the primary AC source;

powering the load and charging all battery strings using the primary AC source; and managing one of the other battery strings while the load is powered by at least one remaining battery string and without using the primary AC source.

2. The electric system of claim 1 wherein during the managing steps, the at least one battery string which is providing power to the load is also providing power to the battery string being managed.

3. The electric system of claim 2 wherein the at least one battery string consists of all battery strings except the battery string being managed.

4. The electric system of claim 2 wherein the battery strings are formed from either lead-acid or nickel/cadmium batteries, and during the managing step, a battery string is finish charged.

5. The electric system of claim 4 wherein the battery strings are lead-acid, and during an infrequent managing step, at least one battery string that powers the load equalizes the other battery string.

6. The electric system of claim 5 wherein said infrequent managing step occurs on the order of semi-annually.

7. The electric system of claim 4 wherein the managing step comprises providing power from the at least one power producing battery string to the finish charge battery string through a DC to DC converter.

8. The electric system of claim 7 wherein the at least one power producing battery string consists of all battery strings except the battery string being finish charged.

9. The electric system of claim 4 wherein the managing step comprises providing power from the at least one power producing battery string to the finish charge battery string through a DC to AC converter and an AC-powered finish charger.

10. The electric system of claim 9 wherein the at least one power producing battery string consists of all battery strings except the battery string being finish charged.

11. The electric system of claim 1 wherein the battery strings are nickel/cadmium or zinc/bromine, and during infrequent managing steps, the battery string being managed is completely discharged.

12. The electric system of claim 1 wherein the primary source is an AC generator, the system further comprising a photovoltaic array for generating solar-powered electricity, the invention further comprising supplementing both the generator and the power-producing battery strings with solar-powered electricity.

13. An electric system comprising:

an AC source;

a load selectively coupled through a switch to said AC source;

at least a pair of battery strings connected in parallel, each battery string having a first terminal and a second terminal, the second terminals being each connected to common negative;

a bi-directional AC-DC converter having an AC port selectively connected to receive electricity from said AC source or to provide an AC output to said load; and a DC port selectively connected to receive a DC input from either of the first terminals of said battery strings or to provide a DC output to either of said first terminals;

a DC converter having an input connected to selectively receive power from either one of said battery strings and an output selectively connected to the first terminal of said other battery string to provide a finish charge said battery string; and wherein said system can selectively charge all battery strings with the AC source; power the load from at least one battery string; and finish charge one battery string while at least one other battery string provides the finish charge and powers the load.

14. The electric system of claim 13 wherein said DC converter is a DC-DC converter and the input of said converter is selectively connected through switches directly to either of the first terminals of said battery strings.

15. The electric system of claim 13 wherein said DC converter is an AC powered finish charger having a DC output, the input of said finish charger being connected to the AC output of said bi-directional converter, either battery string being selectively connected to the DC input of said bi-directional converter, the other battery string being selectively connected to the DC output of said finish charger.

* * * * *